(12) United States Patent
Levi

(10) Patent No.: US 11,293,516 B2
(45) Date of Patent: Apr. 5, 2022

(54) HYDRAULIC DAMPER

(71) Applicant: ROM ACQUISITION CORPORATION, Belton, MO (US)

(72) Inventor: Avraham Y. Levi, Eagan, MN (US)

(73) Assignee: ROM Acquisition Corporation, Belton, MO (US)

( * ) Notice: Subject to any disclaimer, the term of this patent is extended or adjusted under 35 U.S.C. 154(b) by 118 days.

(21) Appl. No.: 16/720,437

(22) Filed: Dec. 19, 2019

(65) Prior Publication Data

US 2021/0190169 A1 Jun. 24, 2021

(51) Int. Cl.
| F16F 9/36 | (2006.01) |
| F16F 9/516 | (2006.01) |
| F16F 9/20 | (2006.01) |
| F16F 9/19 | (2006.01) |
| F16F 9/32 | (2006.01) |

(52) U.S. Cl.
CPC .............. *F16F 9/5165* (2013.01); *F16F 9/19* (2013.01); *F16F 9/20* (2013.01); *F16F 9/3214* (2013.01); *F16F 9/3235* (2013.01); *F16F 9/3242* (2013.01); *F16F 9/368* (2013.01); *F16F 9/369* (2013.01); *F16F 9/3228* (2013.01); *F16F 2222/12* (2013.01); *F16F 2228/066* (2013.01); *F16F 2230/0005* (2013.01); *F16F 2230/30* (2013.01)

(58) Field of Classification Search
CPC .......... F16F 9/5165; F16F 9/20; F16F 9/3214; F16F 9/369; F16F 9/34; F16F 2228/066; F16F 9/19; F16F 9/3235; F16F 9/3242; F16F 9/368; F16F 9/3228; F16F 2222/12; F16F 2230/0005; F16F 2230/30
USPC ......................................... 188/282.8
See application file for complete search history.

(56) References Cited

U.S. PATENT DOCUMENTS

| 3,972,396 | A | * | 8/1976 | Bochnak | ................. B64C 27/51 188/312 |
| 6,202,807 | B1 | * | 3/2001 | Levi | ......................... F16F 9/22 188/282.1 |
| 6,427,889 | B1 | | 8/2002 | Levi | |
| 7,607,522 | B2 | * | 10/2009 | Nygren | ................... B25B 13/48 188/319.1 |
| 2018/0347659 | A1 | * | 12/2018 | Levi | ...................... F16F 9/3235 |

\* cited by examiner

*Primary Examiner* — Xuan Lan Nguyen
(74) *Attorney, Agent, or Firm* — Bradley J. Thorson; DeWitt LLP

(57) ABSTRACT

A hydraulic damper includes a cylinder containing a hydraulic fluid and a piston affixed to a piston rod that extends out from one end of the cylinder through an end cap seal and that divides the cylinder into two chambers. The piston includes a port extending longitudinally through it where the port defines a valve seat. Inserted in the port is a spring-loaded valve member having a central bore extending longitudinally through it of a selected diameter that sets the rate of extension and return of the piston rod during use.

10 Claims, 6 Drawing Sheets

HYDRAULIC DAMPER

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates generally to a hydraulic damper for use in systems where reciprocal forces are applied to a load device to limit the speed of movement of the load.

II. Discussion of the Prior Art

In my U.S. Pat. No. 6,427,889, I describe a ladder rack for hi-bay vans whereby ladders carried atop the roof of a vehicle may be easily transported to a position along the side of the vehicle where a worker may more readily retrieve a ladder for use at a work site and subsequently reload it back on the vehicle's roof. It incorporates a hydraulic damper for counteracting the force of gravity as the ladders are brought over center so that the load is more gently lowered. Like most hydraulic dampers, it includes a cylinder containing a hydraulic liquid, a piston deployed in the cylinder and dividing the interior thereof into first and second chambers. The piston is affixed to an elongated rod that extends through at least one of the chambers to the outside through suitable seals. Designed into the piston is a valve structure that opens and closes to permit or obstruct flow of hydraulic fluid from one of the chambers to the other.

The present invention is deemed to be an improvement over the prior art of which I am aware in terms of its simplicity, ease of manufacture and functionality.

SUMMARY OF THE INVENTION

The hydraulic damper of the present invention includes a tubular body member having first and second ends and in which a tubular sleeve is used to line the lumen of the tubular body member. A piston rod assembly, including an elongate cylindrical rod of a length greater than a length of the tubular main body member, has a cylindrical piston mounted thereon. The piston is dimensioned to fit and slide within the tubular sleeve to thereby define first and second chambers of a variable volume within the sleeve on opposed ends of the piston. The two chambers are adapted to contain a hydraulic fluid. End caps are affixed to the opposed ends of the main body member where the end caps include a central bore for receiving the piston rod through it. The end caps further incorporate seals for inhibiting leakage of the hydraulic fluid from the chambers.

An important aspect of the invention resides in the design of the piston. It includes first and second longitudinal bores of differing diameter that extend inward from opposed end surfaces of the piston and that meet to form a tapered valve seat. The larger of the two bores in the piston contain a valve member and a spring for urging a tapered head end of the valve member against the valve seat. Further, the valve member has a longitudinal bore of a predetermined diameter that extends longitudinally through it.

The piston further incorporates a step in its outer diameter to create first and second zones of differing diameters. The first zone is of a larger diameter than of the second zone and contains a circumferential groove in which a cup seal is disposed. The second zone is of a slightly reduced diameter and it also contains a circumferential groove which is made to intersect with the larger of the two intersecting longitudinal bores in the piston such that when the valve becomes unseated from the valve seat, a flow path is established between the internal diameter of the sleeve and the outer diameter of the piston in the second zone.

Given the above-described configuration, when an external force is applied to the piston rod to extend it further out from the main body, the valve becomes seated whereby the hydraulic fluid must pass through the valve's bore to flow from the shrinking chamber to the expanding chamber such that the rate of movement of the piston rod assembly is reduced. Contraction of the piston rod back into the main body member unseats the valve member such that the hydraulic fluid flow path from the enlarging chamber into the shrinking chamber is through the aligned bores in the valve member and then through the circumferential path between the outer diameter of the piston and the inner diameter of the sleeve. This serves to increase the rate at which the piston rod assembly is able to move.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
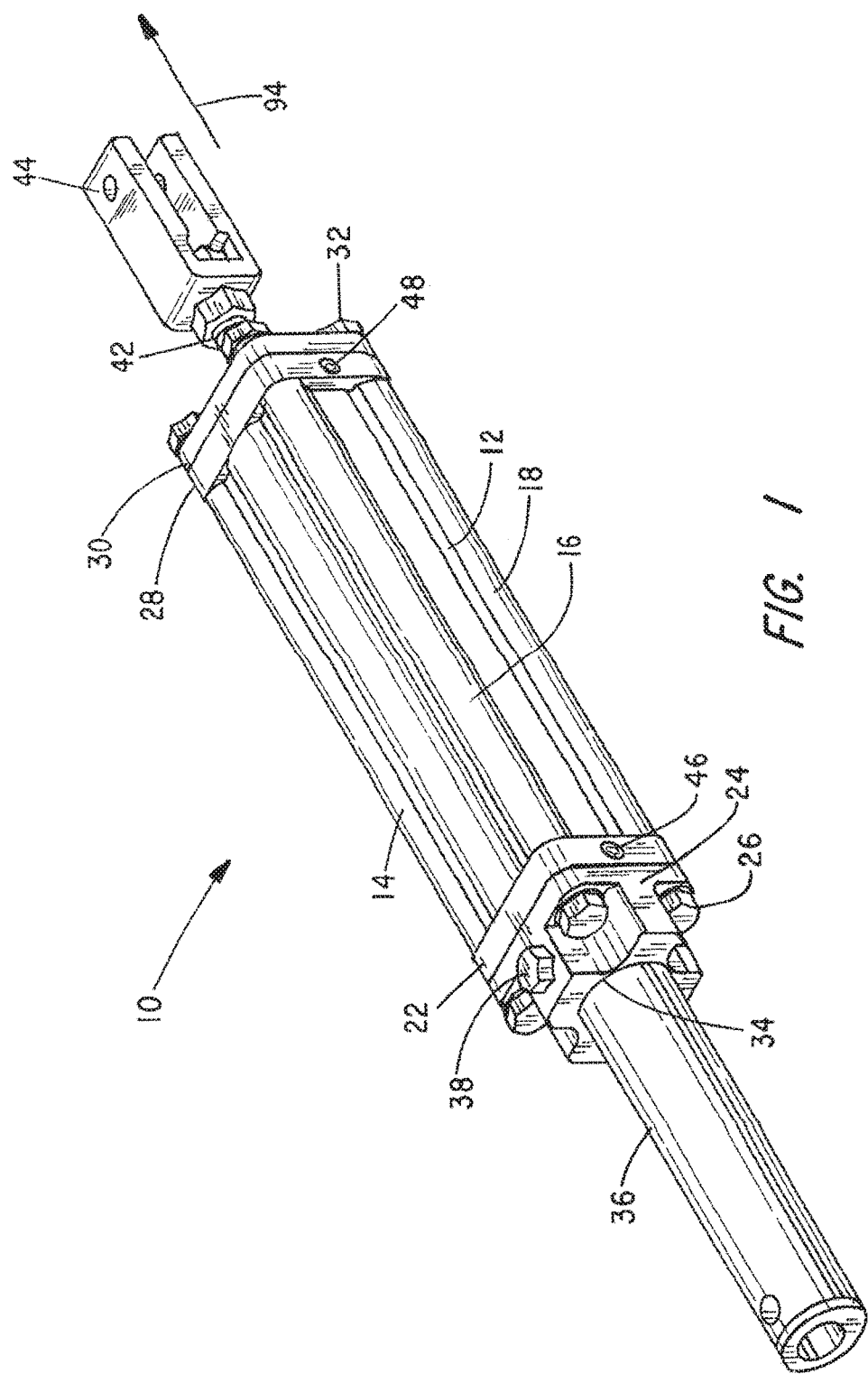
FIG. 1 is a perspective view of the hydraulic damper of the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, there is presented an isometric view of a preferred embodiment of the hydraulic damper 10 of the present invention. It is seen to comprise a main body member 12, which may be a tubular aluminum extrusion defining a central bore 13 of circular cross-section (FIG. 2) and a generally rectangular outer profile with integrally formed rounded tubular longitudinally extending edges 14, 16, 18 and 20. The opposed ends of these rounded tubular edges are internally threaded by which a main cap assembly 22 and a mounting cap 24 are fastened to the left end of the body member by bolts, as at 26, and another main cap assembly 28 and a retaining plate 30 are fastened by bolts, as at 32, to the right end of the main body member 12.

Fitted into a central bore 34 of the mounting cap 24 is an end cap extension member 36, which is held in place by a pair of diametrically arranged bolts 38 and 40. Also seen extending out from the retaining plate 30 at the right end of FIG. 1 is a piston rod 42 having a clevis 44 attached to a threaded end thereof that allows the damper to be fastened to a moveable load object during use.

FIG. 1 also shows setscrew-type plugs 46 and 48 that are fitted into laterally extending bores in the mounting caps 22 and 28. As will be explained below, these bores provide a way by which the dual chambers of the device 10 may be filled with hydraulic fluid prior to use.

Figure 2:
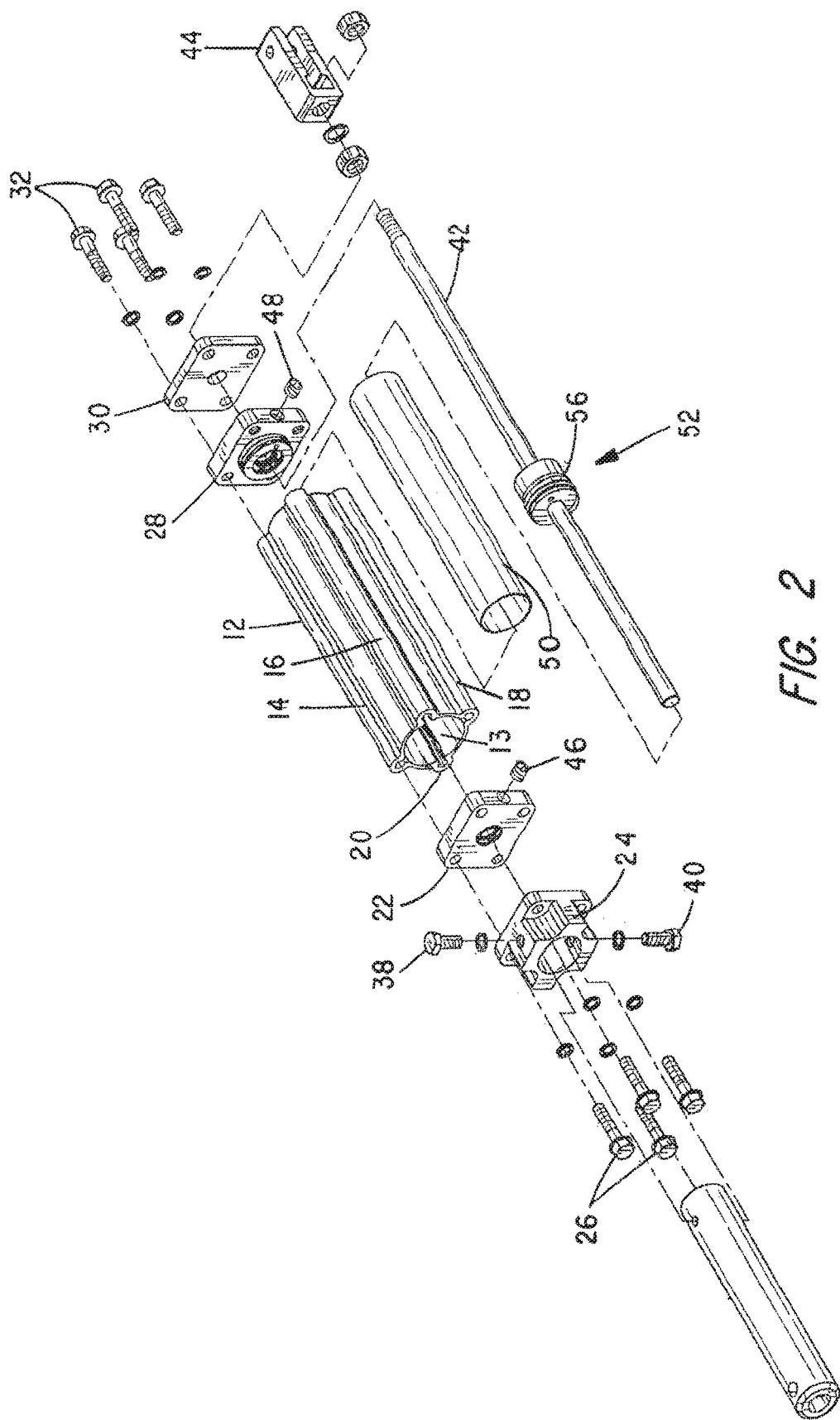
FIG. 2 is an exploded view thereof.

Turning again to the exploded view of FIG. 2, it shows a cylindrical sleeve 50 that is inserted into the central bore 13 of the main body member 12. Disposed within the lumen of the sleeve 50 is the piston rod assembly 52. It comprises a piston rod 42 to which the piston 56 is attached.

Figure 3:
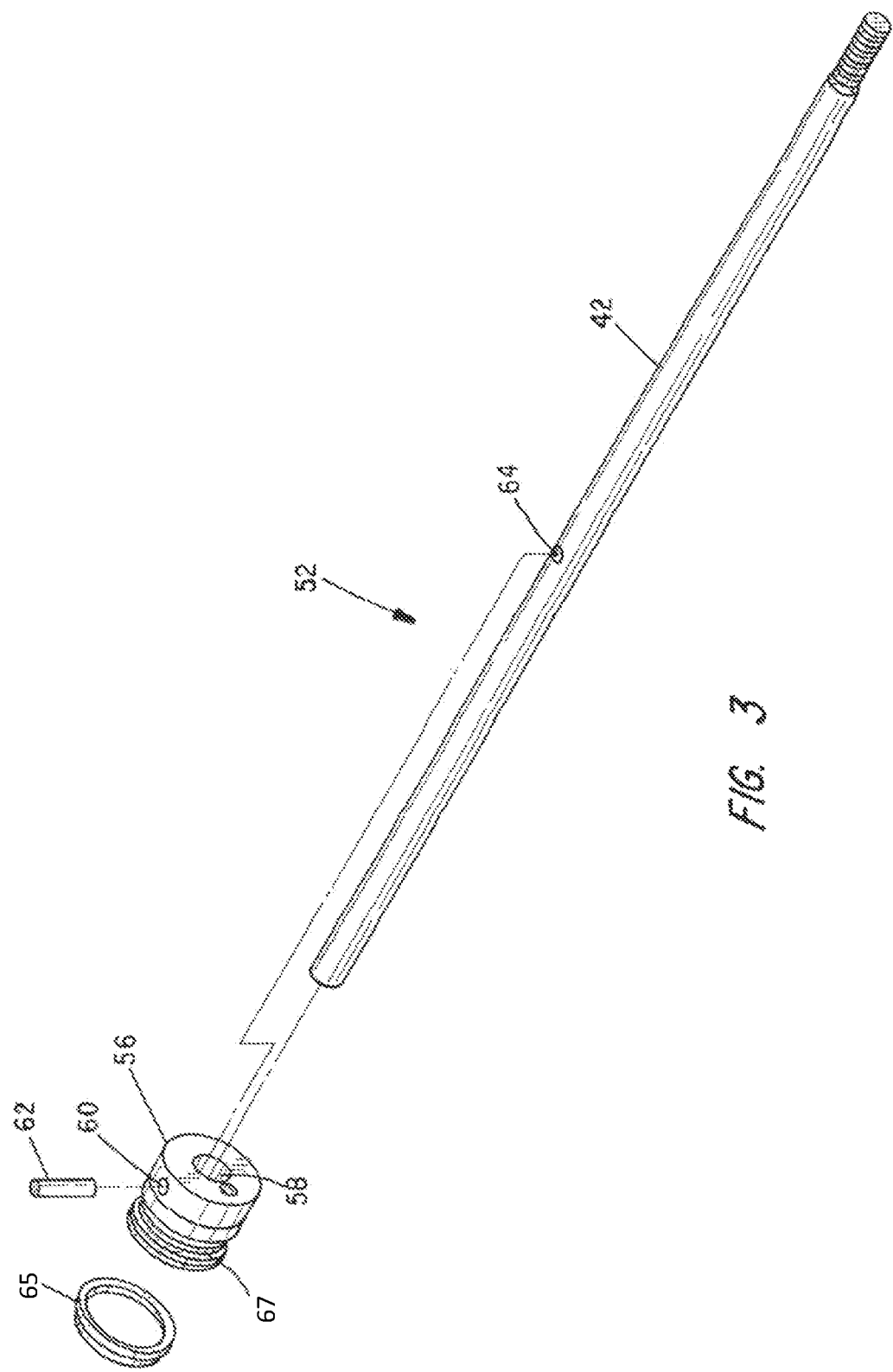
FIG. 3 is an exploded view of the piston rod assembly employed.

FIG. 3 is an enlarged exploded view of the piston rod assembly 52 and it illustrates a preferred way of securing the piston 56 to the piston rod 42. Specifically, the cylindrical piston 56 has a central bore 58 through which the piston rod is inserted. The piston also has a radial bore 60 into which a roll pin 62 is inserted once the bore 60 is aligned with a bore 64 formed through the piston rod.

A buna rubber cup seal 65 is fitted into a circumferential groove 67 in the piston. Thus, with the piston inserted into the sleeve 50 contained in the main body, it effectively divides the interior of the damper assembly 10 into two compartments of variable size as determined by the piston as it is displaced. Each of the two chambers can be filled with the hydraulic fluid via the ports once screw plugs 46 and 48 are removed.

Figure 4:
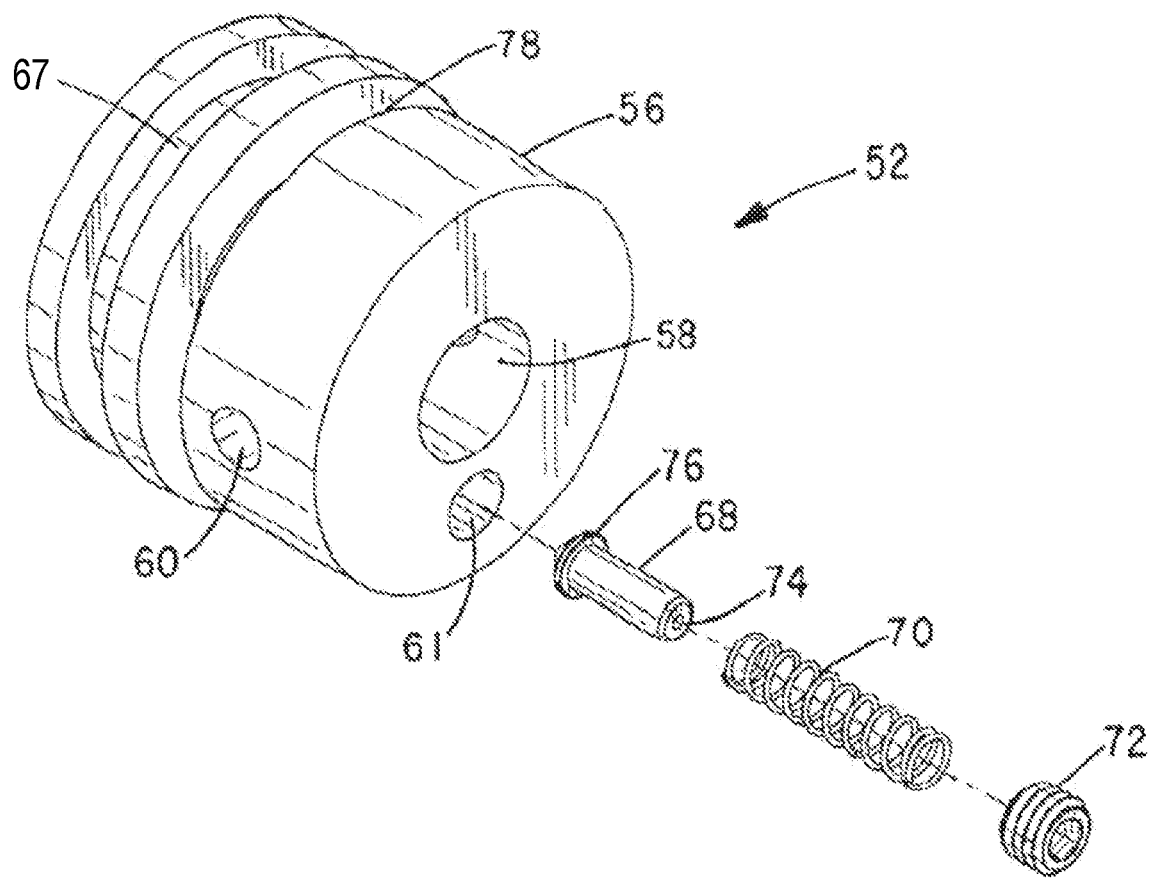
FIG. 4 is an exploded view of the piston assembly.
Figure 5:
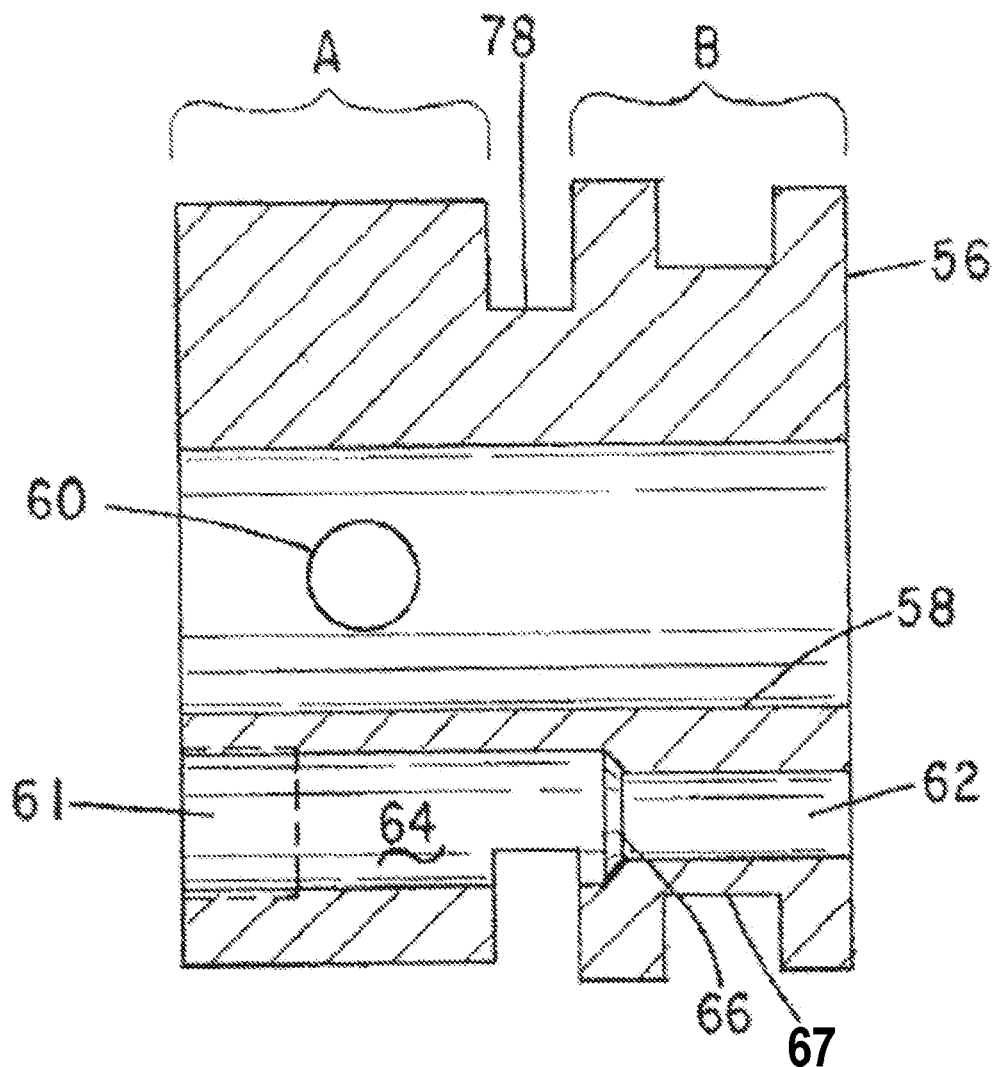
FIG. 5 is a cross-sectional view of the piston assembly.

FIG. 4 is an enlarged perspective view of the piston assembly 52 and FIG. 5 is a longitudinal cross-section thereof. Radially offset from the central bore 58 through which the piston rod fits is a passageway 61. It comprises first and second sections 62 and 64 of differing diameter and defining a tapered valve seat 66 therebetween. Fitted into the larger diameter section 64 is a valve member 68, a valve spring 70 and a hollow (tubular) setscrew 72 for retaining the valve and spring in place while allowing a flow of hydraulic oil through it. The valve 68 has a tapered head and a stem and it also includes a central bore 74 of a predetermined diameter that extends lengthwise through each. The head end 76 is tapered so as to mate and seal with the tapered valve seat 66 formed in the piston.

The cross-sectional view of FIG. 5 also shows that the piston is stepped in its outer diameter where the segment shown encompassed by bracket A is of a lesser outer diameter than that encompassed by bracket B. The circumferential groove 78 in the piston is sufficiently deep to intersects with section 64 of the passageway 61. Thus, when the piston is resident within the sleeve 50 and the valve becomes unseated, a fluid passageway is created through the passage way 61 and through the abovementioned annular passageway.

Figure 6:
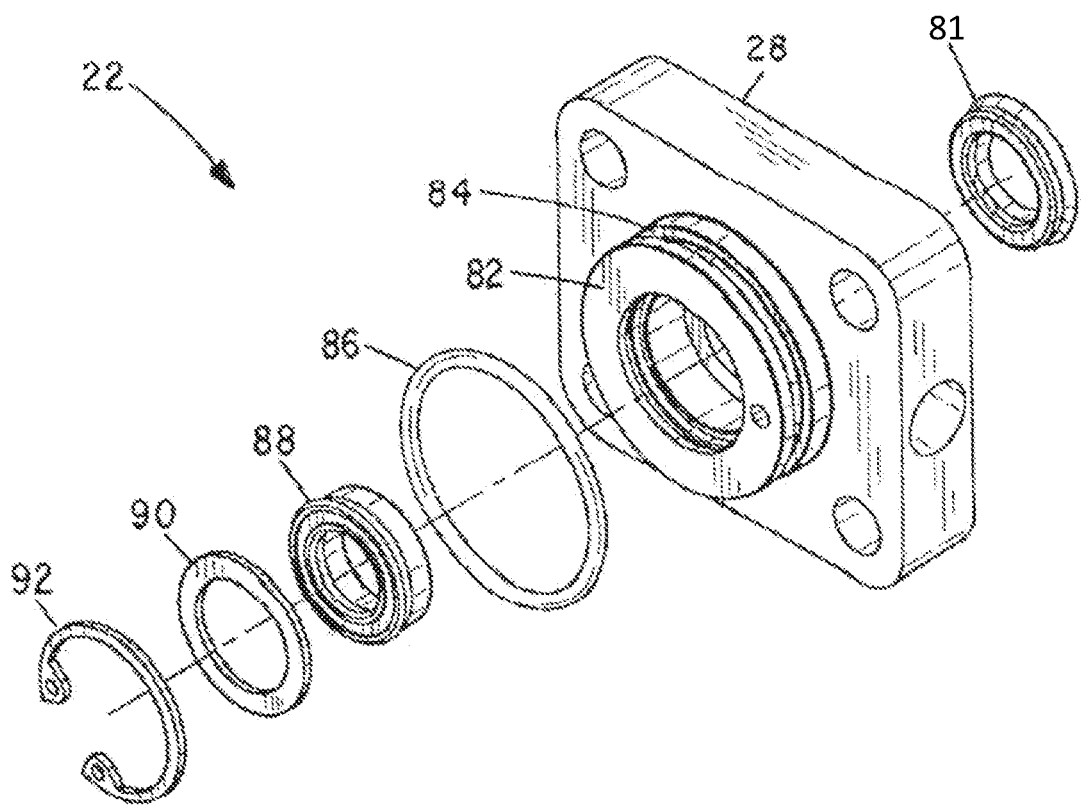
FIG. 6 is an exploded view of the cap assembly used to seal off opposed ends of the main body member as well as about the piston rod extending through it.

FIG. 6 is an exploded view of the main caps 22 used to seal the opposed ends of the main body member 12. They each comprise a machined metal base 28 having a central bore for allowing passage of the piston rod 42 therethrough and surrounding the bore on the outer surface 80 thereof is a cavity (not shown) into which is fitted a soft buna cup seal 81 that wipes dust and dirt off the rod. The inner side of the main caps 22 has a toroidal protuberance 82 with an exterior O-ring groove 84 for receiving an O-ring 86 therein. The O-ring 86 serves to prevent leakage from the seam between the sleeve 50 and the end cap 28.

Shown as being received within the protuberance 82 is a suitable seal, with a hard poly cup seal 88 being a preferred type. A flat washer 90 and a spring clip 92 hold the poly cup seal in place.

Having described in detail the constructional features of the invention, consideration will next be given to the mode of operation thereof.

Assume that in the view of FIG. 1 that the left end thereof is anchored and a force is applied in the direction of the arrow 94 to extend the piston rod 42 from the main body 12. The valve 68 will be seated such that the hydraulic fluid must flow through the restricted diameter bore 74 in the valve member 68. Hence, for a given force, the piston rod will move at a slow rate.

With the piston rod fully extended and the force now assumed to be operating in a direction opposite that of the arrow 94, the valve 68 unseats creating a less restricted flow path for the hydraulic fluid to flow, i.e., not only through the aligned bores 62 and 64 in the piston, but also via the groove 78 to a clearance space between zone A of the piston and the inner-diameter of the sleeve 50. Thus, the speed of movement of a load, say under the force of gravity, will be slow as the piston rod is extracted, but it will move more rapidly when the piston rod is being contracted back into the main body member.

The damper of the present invention is adjustable only in the sense that valve members having differing longitudinal bore 74 dimensions can be utilized at the time of manufacture to offer variations in the rates of movement of the piston to meet specific application requirements.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A hydraulic damper comprising:
   (a) a tubular main body member of a predetermined internal diameter having first and second ends;
   (b) a piston rod assembly including an elongate cylindrical rod of a length greater than a length of the tubular main body member and a cylindrical piston mounted at a predetermined location along the length of the piston rod, the piston being dimensioned to fit and slide within the predetermined internal diameter to define first and second chambers of variable volume within the tubular main body member on opposed ends of the piston, said chambers adapted to contain a hydraulic fluid;

(c) a pair of end caps affixed to the first and second ends of the main body member, the end caps each including a central bore through which the piston rod is fitted, the end caps having sealing means for inhibiting leakage of the hydraulic fluid from the chambers; and (d) wherein the piston includes first and second longitudinal bores of differing diameter extending inward from opposed end surfaces of the piston that meet to form a valve seat, a larger of the bores in the piston containing a valve member and a spring for urging a head end of the valve member against the valve seat, the valve member having a longitudinal bore of a predetermined diameter extending longitudinally therethrough.

2. The hydraulic damper of claim 1 wherein an outer diameter of the piston includes a first circumferential groove having an elastomeric cup seal contained therein.

3. The hydraulic damper of claim 2 wherein the piston has a step in the outer diameter to create first and second zones of differing diameters, said first groove being in the first zone having a larger diameter than that of the second zone and wherein a second circumferential groove is formed in the second zone to intersect with said larger of the bores in the piston whereby when the valve becomes unseated from the valve seat, a first hydraulic fluid flow path is established between the first and second chambers via an internal diameter of the sleeve and an outer diameter of the piston in said second zone.

4. The hydraulic damper of claim 3 wherein extension of the piston rod out from the main body seats the valve member with the valve seat such that a second hydraulic fluid flow path is established from the first chamber into the second chamber through the longitudinal bore in the valve member, said second hydraulic fluid flow path being the only hydraulic fluid flow path from the first chamber onto the second chamber when the valve member is seated with the valve seat.

5. The hydraulic damper of claim 1 wherein the sealing means comprises an annular protuberance integrally formed with and extending out from an interface of the end cap, said protuberance supporting an O-ring in a groove formed in the outer surface of the protuberance and a cup seal for surrounding the piston rod in a central opening of the annular protuberance.

6. A hydraulic damper comprising:

(a) a tubular main body member having first and second ends;

(b) a tubular sleeve lining a lumen of the tubular main body member;

(c) a piston rod assembly including an elongate cylindrical rod of a length greater than a length of the tubular main body member and a cylindrical piston mounted at a predetermined location along the length of the piston rod, the piston being dimensioned to fit and slide within the tubular sleeve to define first and second chambers of variable volume within the tubular sleeve on opposed ends of the piston, said chambers adapted to contain a hydraulic fluid;

(d) a pair of end caps affixed to the first and second ends of the main body member, the end caps each including a central bore through which the piston rod is fitted, the end caps having sealing means for inhibiting leakage of the hydraulic fluid from the chambers; and (e) wherein the piston includes first and second longitudinal bores extending inward from opposed end surfaces of the piston that meet to form a valve seat, said first longitudinal bore having a first diameter and said second longitudinal bore having a second diameter greater than the first diameter, the second longitudinal bore in the piston containing a valve member and a spring for urging a head end of the valve member against the valve seat, the valve member having a longitudinal bore of a predetermined diameter extending longitudinally therethrough.

7. The hydraulic damper of claim 6 wherein an outer diameter of the piston includes a first circumferential groove having an elastomeric cup seal contained therein.

8. The hydraulic damper of claim 7 wherein the piston has a step in the outer diameter to create first and second zones of differing diameters, said first groove being in the first zone having a larger diameter than that of the second zone and wherein a second circumferential groove is formed in the second zone to intersect with said larger of the bores in the piston whereby when the valve becomes unseated from the valve seat, a first hydraulic fluid flow path is established between the first and second chambers via an internal diameter of the sleeve and an outer diameter of the piston in said second zone.

9. The hydraulic damper of claim 8 wherein extension of the piston rod out from the main body seats the valve member with the valve seat such that a second hydraulic fluid flow path is established from the first chamber into the second chamber through the longitudinal bore in the valve member, said second hydraulic fluid flow path being the only hydraulic fluid flow path from the first chamber onto the second chamber when the valve member is seated with the valve seat.

10. The hydraulic damper of claim 6 wherein the sealing means comprises an annular protuberance integrally formed with and extending out from an interface of the end cap, said protuberance supporting an O-ring in a groove formed in the outer surface of the protuberance and a cup seal for surrounding the piston rod in a central opening of the annular protuberance.

* * * * *